United States Patent
Chen et al.

(10) Patent No.: US 12,352,894 B2
(45) Date of Patent: Jul. 8, 2025

(54) WAVELENGTH MIXING FOR OPTICAL SYSTEMS

(71) Applicant: Apple Inc., Cupertino, CA (US)

(72) Inventors: Xi Chen, Sunnyvale, CA (US); Xiaoyang Zhang, Singapore (SG); Prashanth S. Holenarsipur, Fremont, CA (US); Yuta Kuboyama, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 144 days.

(21) Appl. No.: 18/235,590

(22) Filed: Aug. 18, 2023

(65) Prior Publication Data
US 2024/0094346 A1     Mar. 21, 2024

Related U.S. Application Data

(60) Provisional application No. 63/408,408, filed on Sep. 20, 2022.

(51) Int. Cl.
*G01S 7/48*     (2006.01)
*G01S 7/481*    (2006.01)
*G01S 17/08*    (2006.01)

(52) U.S. Cl.
CPC ............ *G01S 7/4813* (2013.01); *G01S 17/08* (2013.01)

(58) Field of Classification Search
CPC ...... G01S 7/4813; G01S 17/08; G01S 7/4802; G01S 7/4815
See application file for complete search history.

(56) References Cited

U.S. PATENT DOCUMENTS

| | | | |
|---|---|---|---|
| 6,137,117 A | 10/2000 | Feldstein et al. | |
| 7,128,266 B2 | 10/2006 | Zhu et al. | |
| 7,626,704 B2 | 12/2009 | Lundquist et al. | |
| 8,698,713 B2 | 4/2014 | Hajjar et al. | |
| 10,145,711 B2 | 12/2018 | Boonsom et al. | |
| 10,222,475 B2 | 3/2019 | Pacala et al. | |
| 11,181,477 B2 | 11/2021 | Rothberg et al. | |
| 2014/0275852 A1* | 9/2014 | Hong | A61B 5/0002 600/479 |
| 2019/0329065 A1 | 10/2019 | Gandel | |
| 2022/0137188 A1* | 5/2022 | Satoh | G01S 7/4808 356/4.01 |
| 2024/0222543 A1* | 7/2024 | Chen | H10F 55/25 |

* cited by examiner

*Primary Examiner* — Tony Ko
(74) *Attorney, Agent, or Firm* — Brownstein Hyatt Farber Schreck, LLP

(57) ABSTRACT

An optical system includes a housing defining a cylindrical lens array. A first light source is located in the housing and positioned to emit a first wavelength of light into a first field of illumination impinging on the cylindrical lens array. A second light source is located in the housing and positioned to emit a second wavelength of light into a second field of illumination impinging on the cylindrical lens array. The cylindrical lens array alters the first field of illumination and the second field of illumination and increases an overlap between the first field of illumination and the second field of illumination. A detector is located in the housing and positioned to receive a first redirected portion of the first wavelength of light and a second redirected portion of the second wavelength of light.

20 Claims, 9 Drawing Sheets

WAVELENGTH MIXING FOR OPTICAL SYSTEMS

CROSS-REFERENCE TO RELATED APPLICATION

This application is a nonprovisional and claims the benefit under 35 U.S.C. 119(e) of U.S. Provisional Patent Application No. 63/408,408, filed Sep. 20, 2022, the contents of which are incorporated herein by reference as if fully disclosed herein.

FIELD

This disclosure relates generally to optical systems. More particularly, this disclosure relates to optical systems having two or more light sources that are capable of illuminating a target, and a detector that is capable of detecting a returned portion of the light emitted by each light source.

BACKGROUND

Optical systems may sometimes include multiple light sources, each of which is intended to illuminate a common target. Such optical systems may be used in various applications and, in some cases, may be used to determine the proximity of an object or a proximity to a particular type of object. Such optical systems may also or alternatively be used to determine a type of matter that is proximate to the optical system.

SUMMARY

Embodiments of the systems, devices, methods, and apparatuses described in the present disclosure are directed to an optical system that increases the overlap emitted by different light sources of an optical system. In some embodiments, the optical system may be an active optical sensor (i.e., an optical sensor that emits its own light and detects a returned portion of the light).

In some examples, the present disclosure describes an optical system. The optical system may include a housing defining a cylindrical lens array. A first light source may be located in the housing and positioned to emit a first wavelength of light into a first field of illumination impinging on the cylindrical lens array. A second light source may be located in the housing and positioned to emit a second wavelength of light into a second field of illumination impinging on the cylindrical lens array. The cylindrical lens array may alter the first field of illumination and the second field of illumination and increase an overlap between the first field of illumination and the second field of illumination. A detector may be located in the housing and positioned to receive a first redirected portion of the first wavelength of light and a second redirected portion of the second wavelength of light.

In some examples, the present disclosure describes another optical system. The optical system may include multiple light sources operable to emit multiple wavelengths of light, a diffuser, and a detector. The diffuser may be positioned to receive light from the multiple light sources, diffuse light on a first axis, and pass light on a second axis. The detector may be positioned to receive redirected portions of the emitted multiple wavelengths of light from a target. The diffuser may direct the multiple wavelengths of light into respective fields of illumination having a defined overlap. The defined overlap may be independent of a tilt of the optical system with respect to the target when the target is within a range of distances from the optical system.

In some examples, the present disclosure describes a method of optically sensing a target. The method may include emitting a first wavelength of light, via a first light source, into a first field of illumination; emitting a second wavelength of light, via a second light source, into a second field of illumination; diffusing the first wavelength of light and the second wavelength of light, via a cylindrical lens array, along a first axis relative to the first and second light sources; and passing the first wavelength of light and the second wavelength of light, via the cylindrical lens array, along a second axis relative to the first and second light sources, the diffusing and passing altering the first field of illumination and the second field of illumination and increasing an overlap between the first field of illumination and the second field of illumination.

In addition to the example aspects and embodiments described above, further aspects and embodiments will become apparent by reference to the drawings and by study of the following description.

Figure 1A:
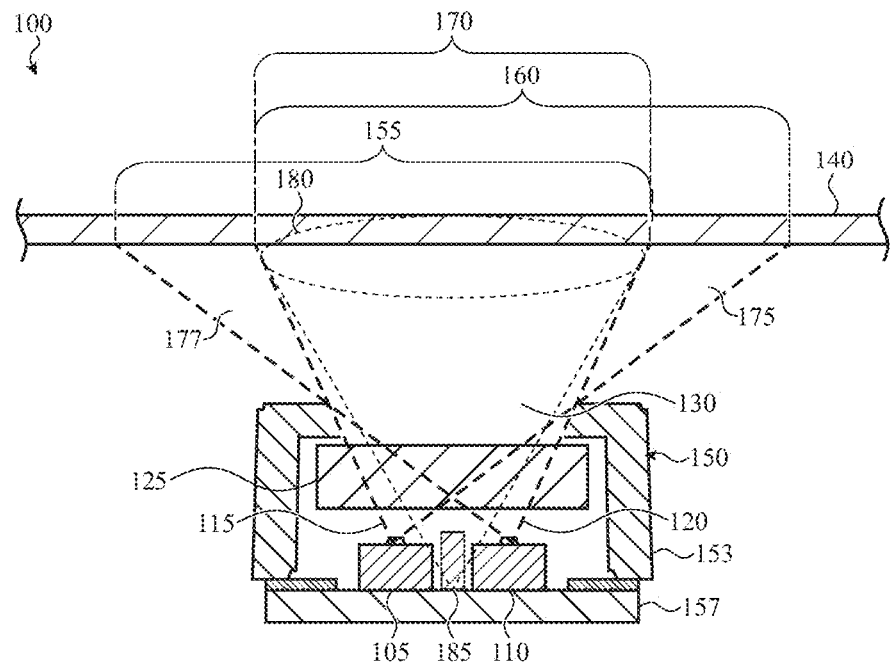
FIGS. 1A and 1B illustrate a first example of an optical system.

It should be understood that the proportions and dimensions (either relative or absolute) of the various features and elements (and collections and groupings thereof) and the boundaries, separations, and positional relationships presented between them, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

Described herein are optical systems that employ multiple light sources (i.e., two or more light sources) and emit multiple wavelengths of light toward a target. The optical systems may be used for proximity detection, type of matter detection, and/or other purposes. The multiple wavelengths of light may pass through a cylindrical lens array that functions as a diffuser. The cylindrical lens array may diffuse light on a first axis and pass light on a second axis, thus enabling a target to be illuminated with approximately equal size overlapping footprints of different wavelengths of light, regardless of whether the optical system (and in particular, a plane from which light is emitted) is parallel to the target or tilted at an angle relative to the target (i.e., non-parallel to the target, or skewed relative to the target).

In some embodiments, the optical systems may be configured (or used) as a proximity detector or matter detector, as described herein. The proximity or matter detector may include a first light source for emitting a first wavelength of light and a second light source for emitting a second wavelength of light. The first light source may have a first field of illumination and the second light source may have a second field of illumination. A diffuser (e.g., a cylindrical lens array) may alter the first and second fields of illumination and increase an overlap between the first and second fields of illumination. The diffuser may also cause the overlap between the first and second fields of illumination to be substantially tilt-independent—especially within a range of distances from the optical system.

Because of the increasing emphasis on smaller, more compact electronic devices, the size and thickness of the components inside of an electronic device may be limited. In some examples, a particular size of the electronic device may be targeted, and each component within the electronic device may be restricted to a maximum form factor or area that the component(s) can occupy within the electronic device. Accordingly, the physical configuration and efficiency of components such as batteries, optical elements, light emitters, detectors, and circuits may become increasingly important to the form factor of the device. In some examples, the optical systems described herein may be included in various handheld or portable electronic devices, such as mobile devices and wearable devices (e.g., smart phones, tablet computers, electronic watches, fitness monitors, health monitors, earbuds, or any type of device that may be worn by a user (e.g., a cuff, bracelet, or earpiece).

Directional terminology, such as "top", "bottom", "upper", "lower", "front", "back", "over", "under", "above", "below", "left", or "right" may be used with reference to the orientation of some of the components in some of the figures described below. Because components in various embodiments can be positioned in a number of different orientations, directional terminology is used for purposes of illustration only and is usually not limiting. The directional terminology is intended to be construed broadly, and therefore should not be interpreted to preclude components being oriented in different ways. Also, as used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

These and other embodiments are discussed below with reference to FIGS. 1A-9. However, those skilled in the art will readily appreciate that the detailed description given herein with respect to these figures is for explanatory purposes only and should not be construed as limiting.

Representative applications of methods and apparatuses according to the present disclosure are described in this section. These examples are being provided solely to add context and aid in the understanding of the described examples. It will thus be apparent to one skilled in the art that the described examples may be practiced without some or all of the specific details. Other applications are possible, such that the following examples should not be taken as limiting.

FIG. 1A illustrates an example optical system 100 having multiple light sources positioned in a plane parallel to a target, and corresponding fields of illumination for the light sources. In particular, the optical system 100 includes a first light source 105 and a second light source 110. The optical system 100 may include additional elements as will be described in further detail with reference to FIGS. 5-6B. The first and second light sources 105, 110 may be positioned proximate to one another and may respectively emit a first wavelength of light 115 and a second wavelength of light 120. The first and second wavelengths of light 115, 120 may be emitted through an aperture 130 (or respective apertures) in a housing 150, toward a target 140. The first wavelength of light 115 may be emitted into a first field of illumination 155, and the second wavelength of light 120 may be emitted into a second field of illumination 160. In some embodiments, the light emitted by the first and second light sources 105, 110 may impinge on, and pass through (or be redirected through), an optical element 125 (e.g., a lens) that directs light toward the target 140.

The housing 150 may be a single element housing or a multiple element housing. As shown, the housing 150 may include various housing components (e.g., three separate housing components that are adhesively bonded or otherwise attached to each other), such as a frame 153, a substrate 157 attached to the frame 153, and the optical element 125. The first and second light sources 105, 110 may be mounted on (and in some cases electrically connected to) the substrate 157 of the housing 150, such that the first and second light sources 105, 110 extend into (and are located in) the housing 150.

A detector 185 (e.g., an optical detector, such as a photodiode or array of photodiodes) may be mounted on the substrate 157 and located in the housing 150. The detector 185 may receive a redirected portion of the first wavelength of light 115 and a redirected portion of the second wavelength of light 120. In embodiments that include the optical element 125, the detector 185 may receive the redirected portions of the first and second wavelengths of light 115, 120 through another optical element (e.g., an optical element positioned behind the optical element 125 in FIG. 1A, not shown).

In FIG. 1A, the housing 150 may position the light sources 105, 110 in a plane that is parallel, or approximately parallel, to the target 140. The term "approximately parallel" is used herein to describe two surfaces that are parallel or within a few degrees of parallel (e.g., within two to three degrees or less of being parallel to one another). Because of the different locations of the first and second light sources 105, 110, the first field of illumination 155 may be skewed toward a first footprint on the target 140, and the second field of illumination 160 may be skewed toward a second footprint, different from the first footprint, on the target 140. The first and second fields of illumination 155, 160 may have an overlapping area 170 on the target 140 (i.e., the footprints of the fields of illumination 155, 160 on the target 140 may overlap in an area 170). The footprints of the first and second fields of illumination 155, 160 on the target 140 may also have respective non-overlapping areas 175, 177. Regardless, the amounts of light that the first and second light sources 105, 110 project on the target 140 and, in particular, the amounts of light that the first and second light sources 105, 110 project on the target 140 within a detection area 180 of the detector 185, may be about the same. Alternatively, the amounts of light that the first and second light sources 105, 110 project on the target 140 and, in particular, the amounts of light that the first and second light sources 105, 110 project on the target 140 within the detection area 180 of the detector 185, may differ, but the ratio of the amounts of light may be known.

Figure 1B:
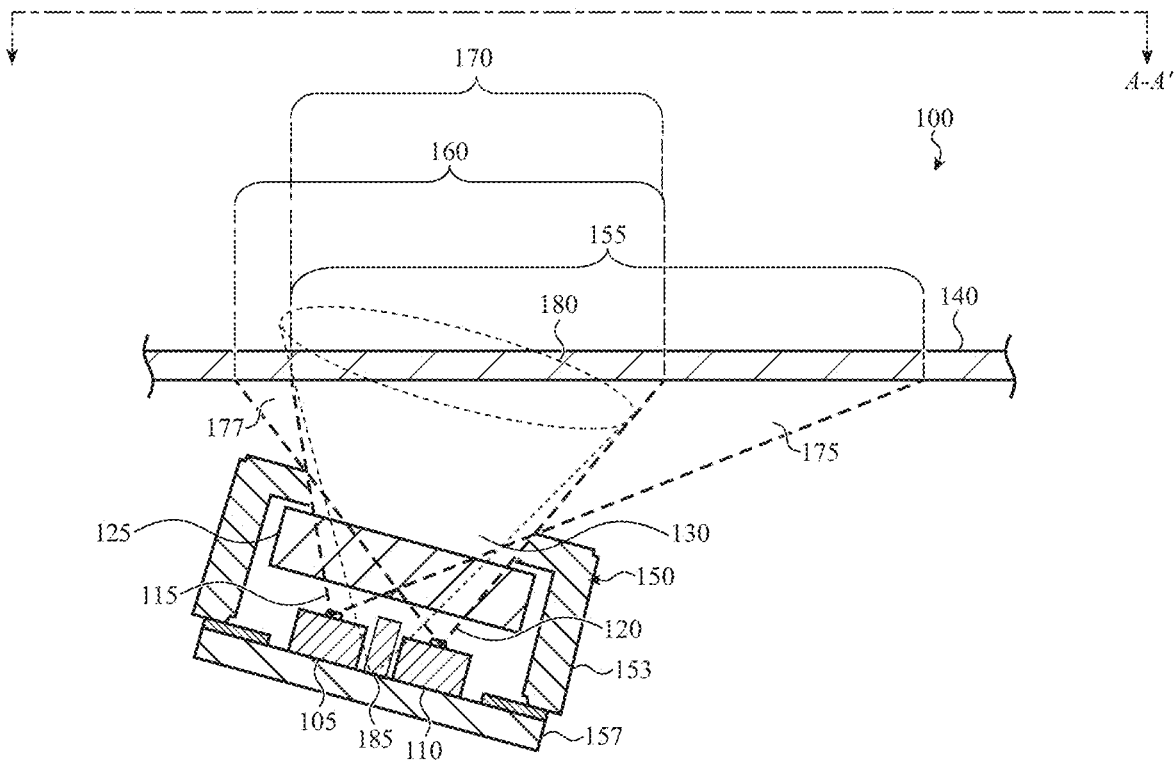

Because the optical system 100 may be used in various types of electronic devices and applications, the optical system 100 may be placed in various positions, including in positions where the light sources 105, 110 are positioned in a plane parallel to a target, as shown in FIG. 1A, and in positions where the light sources 105, 110 are positioned in a plane that is tilted with respect to a target, as shown in FIG. 1B.

Similarly to what is shown in FIG. 1A, FIG. 1B shows that the footprints of the first and second fields of illumination 155, 160, on the target 140, have an overlapping area 170 and respective non-overlapping areas 175, 177. However, in contrast to what is shown in FIG. 1A, the non-overlapping areas 175, 177 span substantially different-sized areas. As a result, the ratio of the amount of light that each field of illumination 155, 160 contributes to the detection area 180 differs from the ratio of the amount of light that each field of illumination 155, 160 contributes to the detection area 180 in FIG. 1A.

Because the amount of light that the first and second light sources 105, 110 contribute to the detection area 180 is angular dependent (i.e., dependent on whether and how much the plane in which the light sources 105, 110 are positioned is tilted with respect to the target 140), a ratio of the amount of light of the first wavelength that impinges on the target 140 to the amount of light of the second wavelength that impinges on the target 140 differs between the scenario illustrated in FIG. 1A and the scenario illustrated in FIG. 1B. This can be problematic in that a ratio of the amount of light of the first wavelength returned to the detector 185 from the target 140 to the amount of light of the second wavelength returned to the detector 185 from the target 140 (referred to herein as a dual wavelength ratio) can provide useful information, which information can be used to determine, for example, a proximity to the target 140 and/or a type of matter of the target 140; however, when the ratio of the amount of light of the first wavelength that impinges on the target 140 to the amount of light of the second wavelength that impinges on the target 140 differs based on the tilt of the optical system 100 or the target 140, the dual wavelength ratio varies somewhat arbitrarily and becomes less useful or useless for the purposes of determining a proximity to the target 140 and/or a type of matter of the target 140.

Figure 2:
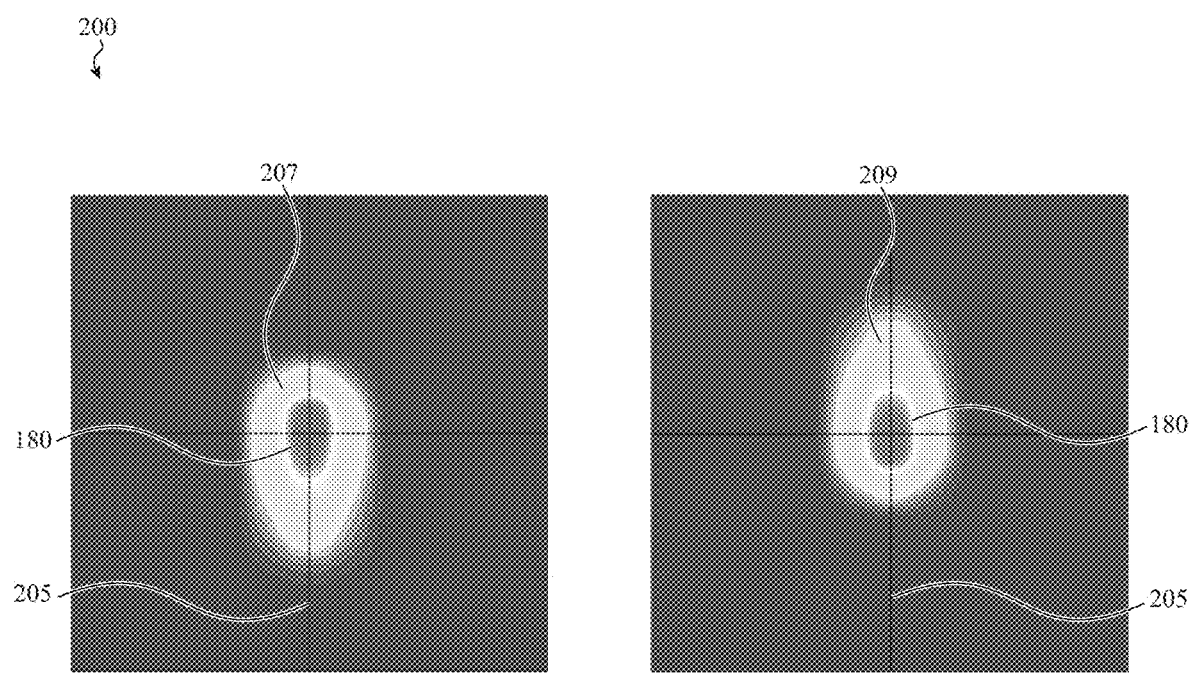
FIG. 2 illustrates example beam profiles of the light that is redirected from the target in FIG. 1B.

FIG. 2 illustrates example beam profiles 200 of the light that is redirected from the target in FIG. 1B, from the viewpoint of view line A-A'. As illustrated, the beam profile 207 illustrates an uneven contribution of light (e.g., an asymmetric contribution), about the detection area 180 shown in FIG. 1B, from the first light source shown in FIG. 1B. The beam profile 209 illustrates an uneven contribution of light (e.g., an asymmetric contribution), about the detection area 180, from the second light source shown in FIG. 1B. As previously mentioned, the light contribution of each light source is angular dependent (i.e., dependent on a tilt of the optical system with respect to a target) and results in undesirable asymmetric beam profiles in one direction (e.g., the y-direction).

The beam profile 207 is skewed on a first axis 205 in a first direction, and the beam profile 209 is skewed on the first axis 205 in a second direction. The skewed beam profiles 207, 209 in two different directions along one axis 205 are due to the uneven light contributions that result from the tilt of the optical system with respect to the target in FIG. 1B. If the optical system 100 were to be tilted in the other direction, the skewed beam profiles would be reversed. Stated differently, the beam profile 207 would be skewed on the first axis in the second direction, and the beam profile 209 would be skewed on the first axis in the first direction.

Figure 3A:
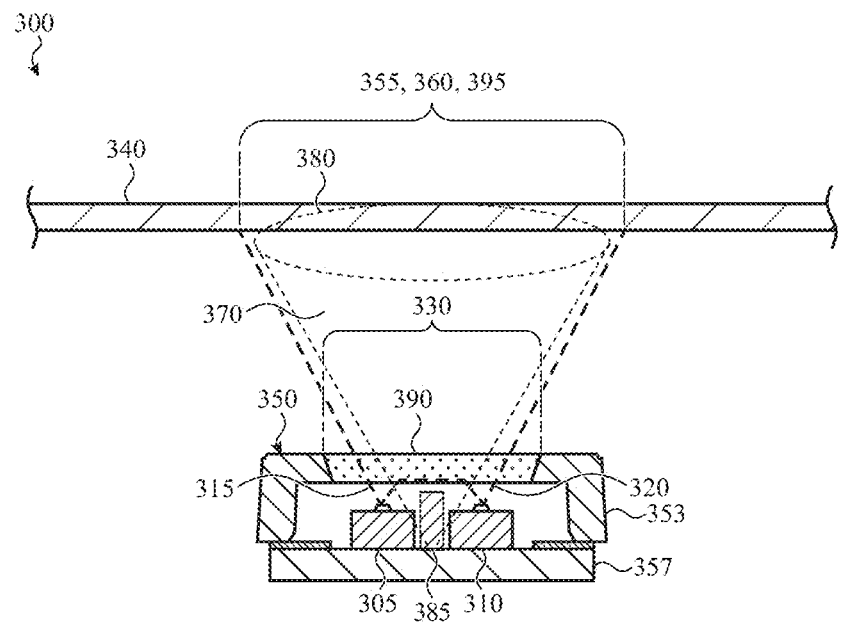
FIGS. 3A and 3B illustrate a second example of an optical system.

FIG. 3A illustrates an example optical system 300 having multiple light sources positioned in a plane parallel to a target, and corresponding fields of illumination for the light sources. Similar to the optical system of FIGS. 1A and 1B, the optical system 300 may include a first light source 305 and a second light source 310 that emit a first wavelength of light 315 and a second wavelength of light 320, respectively. The optical system 300 may also include a diffuser 390. The diffuser 390 may be positioned in an aperture 330 of a housing 350, and the first and second wavelengths of light 315, 320 may impinge on the diffuser 390.

In some embodiments, the diffuser 390 may be or include a cylindrical lens array or optical element that performs a similar function. The diffuser 390 may diffuse light on a first axis (e.g., a first axis parallel to the substrate 357) and pass light on a second axis (e.g., a second axis, parallel to the substrate 357 and orthogonal to the first axis). The first and second light sources 305, 310 may be disposed at different positions arranged along the first axis (and orthogonal to the second axis). The diffuser 390 may suppress the angular dependency of the light emitted by the first and second light sources 305, 310, and may converge (or partially converge) the fields of illumination 355, 360 of the first and second light sources 305, 310. Example embodiments of the diffuser 390 (e.g., cylindrical lens arrays) are described in further detail with reference to FIGS. 5-6C.

Similarly to the housing described with reference to FIGS. 1A and 1B, the housing 350 may be a single element housing or a multiple element housing. As shown, the housing 350 may include various housing components (e.g., three separate housing components that are adhesively bonded or otherwise attached to each other), such as a frame 353, a substrate 357 attached to the frame 353, and the diffuser 390. The first and second light sources 305, 310 may be mounted on (and in some cases electrically connected to) the substrate 357 of the housing 350, such that the first and second light sources 305, 310 extend into (and are located in) the housing 350.

A detector 385 (e.g., an optical detector, such as a photodiode or array of photodiodes) may be mounted on the substrate 357 and located in the housing 350. The detector 385 may receive a redirected portion of the first wavelength of light 315 and a redirected portion of the second wavelength of light 320. The detector 385 may receive the redirected portions of the first and second wavelengths of light 315, 320 through another optical element (e.g., an optical element positioned behind the diffuser 390 in FIG. 3A, not shown).

In FIG. 3A, the housing 350 may position the first and second light sources 305, 310 in a plane that is parallel, or approximately parallel, to a target 340. The axes of the light emitted by the first and second light sources 305, 310 are normal to the target 340. The first wavelength of light 315, emitted by the first light source 305, has a first field of illumination 355. The second wavelength of light 320, emitted by the second light source 310, has a second field of illumination 360. In some embodiments, the fields of illumination 355, 360 may overlap each other completely, such that there are no non-overlapping areas. In other embodiments, the fields of illumination 355, 360 may overlap at least 50%, at least 75%, at least 90%, or at least 95% (at least within a predetermined range of distances from the diffuser 390, such as, within a range of 1-4 millimeters (mm) from the diffuser 390). As shown, the fields of illumination 355, 360 of the light sources 305, 310 may be altered by the diffuser 390, such that the footprints of the fields of illumination 355, 360 overlap on the target 340 in an area 395. The greater the overlap, the more likely it is that reflected portions of the first and second wavelengths of light 315, 320 will be reflected from the same target 340 and same portion (or same general portion) of the target 340. Regardless, the amounts of light that the first and second light sources 305, 310 project on the target 340 and, in particular, the amounts of light that the first and second light sources 305, 310 project on the target 140 within a detection area 380 of the detector 385, may be about the same. Alternatively, the amounts of light that the first and second light sources 305, 310 project on the target 340 and, in particular, the amounts of light that the first and second light sources 305, 310 project on the target 340 within the detection area 380 of the detector 385, may differ, but the ratio of the amounts of light may be known.

Figure 3B:
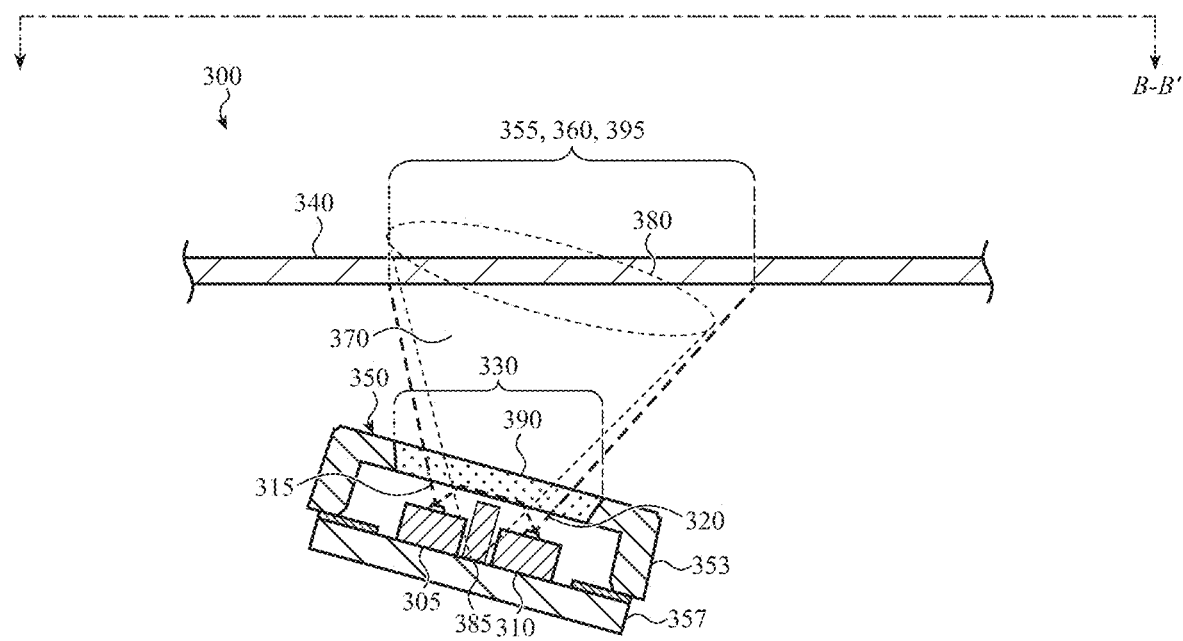

Similarly to the optical system described with reference to FIGS. 1A and 1B, the optical system may be used in various types of electronic devices and applications, and the light sources 305, 310 may not always be positioned in a plane parallel to a target, as shown in FIG. 3A. FIG. 3B shows the light sources 305, 310, and the optical system 300 as a whole, in a skewed position with respect to the target 340.

Similarly to what is shown in FIG. 3A, FIG. 3B shows that the footprints of the first and second fields of illumination 355, 360, on the target 340, have an overlapping area 370 and, once again, no non-overlapping areas. As a result, the ratio of the amount of light that each light source 305, 310 contributes to the detection area 380 is the same as in FIG. 3A.

Because the amount of light that the first and second light sources 305, 310 contribute to the detection area 380 is angular independent (i.e., not dependent on whether and how much the plane in which the light sources 305, 310 are positioned is tilted with respect to the target 340), a ratio of the amount of light of the first wavelength that impinges on the target 340 to the amount of light of the second wavelength that impinges on the target 340, does not differ between the scenario illustrated in FIG. 3A and the scenario illustrated in FIG. 3B (or, depending on the amount of overlap between the first and second fields of illumination 355, 360, differs less than what is shown in FIGS. 1A and 1B). This means that a ratio of the amount of light of the first wavelength returned to the detector 385 from the target 340 to the amount of light of the second wavelength returned to the detector 385 from the target 340 (referred to herein as a dual wavelength ratio) can provide useful information, which information can be reliably used to determine, for example, a proximity to the target 340 and/or a type of matter of the target 340.

In some embodiments, the first and second wavelengths of light 315, 320 may be the same wavelength of light. In other embodiments, the first and second wavelengths of light 315, 320 may be different wavelengths of light. For example, in some embodiments, the first wavelength of light 315 may be a wavelength within a range of 1000-1100 nanometers, and the second wavelength of light may be a wavelength within a range of 1400-1500 nanometers. Such wavelengths or ranges of wavelengths can be useful for determining a type of matter of the target 340. For example, the first and second wavelengths of light 315, 320 may be emitted at different times, and the detector 385 may be operated (e.g., by a processor) to sequentially receive and quantify a first redirected portion of the first wavelength of light and a second redirected portion of the second wavelength of light (e.g., portions of the first and second wavelengths of light that are redirected from the target 340). The processor may receive, from the detector, a first signal representing the first redirected portion of the first wavelength of light and a second signal representing the second redirected portion of the second wavelength of light. In some embodiments, the processor may use the first and second signals to calculate a tilt-independent dual wavelength ratio (i.e., a ratio of the returned amounts of light of the first and second wavelengths of light 315, 320). The tilt-independent dual wavelength ratio may then be compared to dual wavelength ratios corresponding to different types of matter to determine a type of matter of the target 340. Additionally or alternatively, the first and second signals and/or the dual wavelength ratio may be used to determine whether the optical system 300 is proximate to the target 340 (or proximate to a particular type of target, such as a person).

Figure 4:
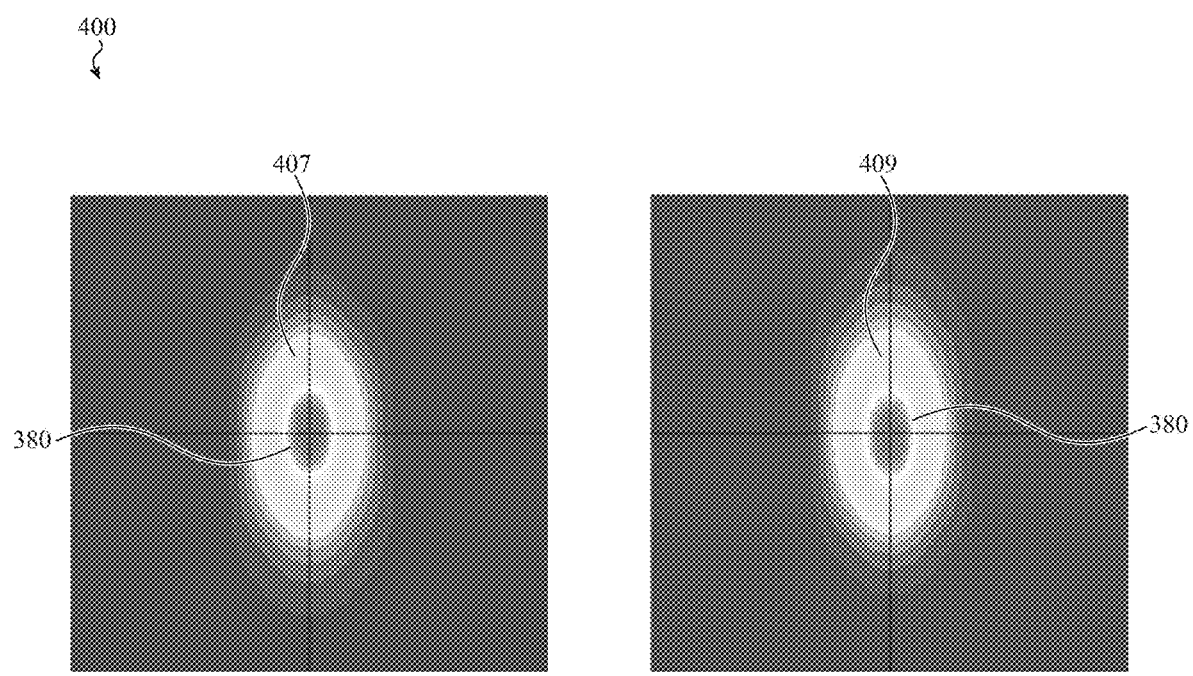
FIG. 4 illustrates example beam profiles of the light that is redirected from the target in FIGS. 3A and 3B.

FIG. 4 illustrates example beam profiles 400 of the light that is redirected from the target in FIG. 3A or 3B, from the viewpoint of view line B-B'. As illustrated, the beam profile 407 illustrates an even contribution of light (e.g., a symmetric contribution), about the detection area 380 in FIG. 3A or 3B, from the first light source shown in FIG. 3A or 3B. The beam profile 409 illustrates an even contribution of light (e.g., a symmetric contribution), about the detection area 380, from the second light source 310 shown in FIG. 3A or 3B.

In contrast to the beam profiles described with reference to FIG. 2, the light contributions of each light source are even and are angular independent, regardless of the orientation of an optical system with respect to a target. In some embodiments, however, the construction of a diffuser (e.g., a cylindrical lens array) may be designed to provide somewhat less than a perfect convergence of the fields of illumination of a pair of light sources, and the beam profiles 407, 409 may be less than perfectly aligned.

In some embodiments, an optical system such as the system described with reference to FIGS. 3A-4 may have more than two light sources that emit light through a diffuser that diffuses light in one direction (e.g., a cylindrical lens array). In these embodiments, all of the light sources may be disposed along a same axis. Alternatively, the light sources may be staggered or arranged in other ways to provide various effects (or for various purposes).

Figure 5:
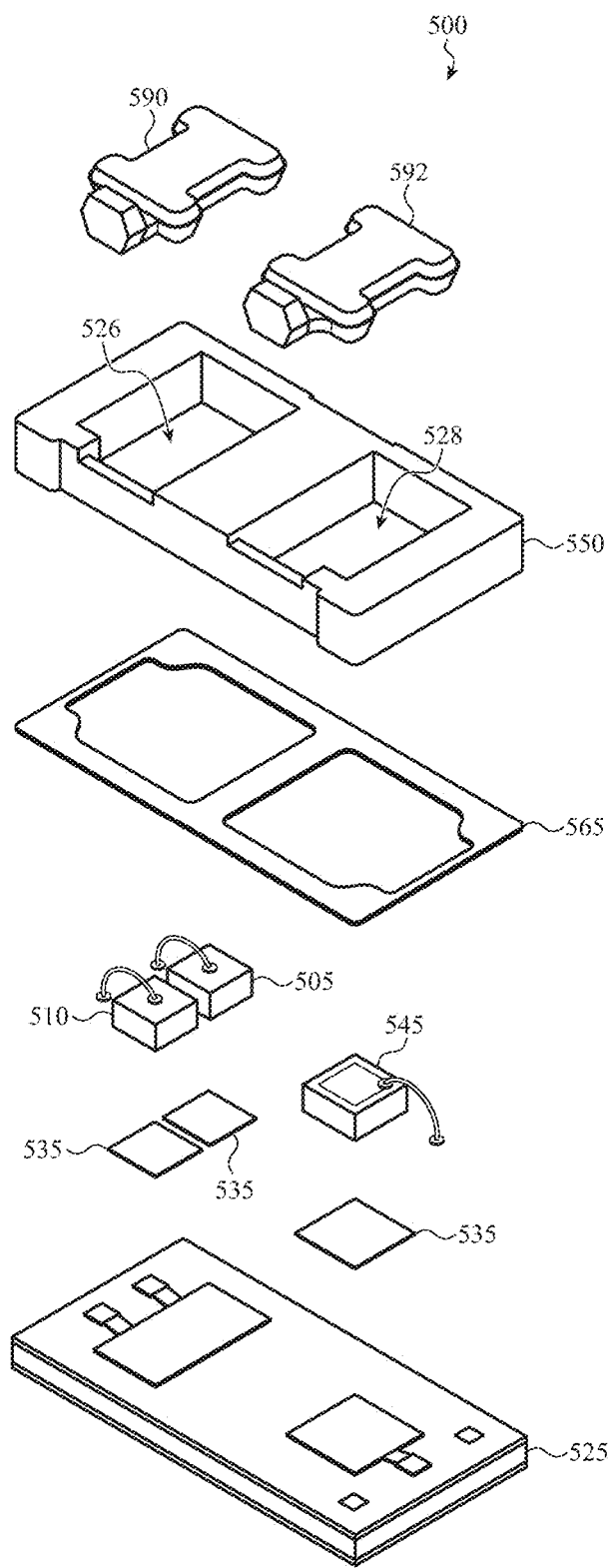
FIG. 5 shows an example optical system that includes the diffuser and other elements of FIGS. 3A and 3B.

FIG. 5 shows an example optical system 500 that includes the diffuser described with reference to FIGS. 3A and 3B. The optical system 500 may also include additional elements from the optical systems described in FIGS. 1A and 1B and 3A and 3B. By way of example, the optical system 500 is shown to include a substrate 525, an adhesive 535, first and second light sources 505, 510, a detector 545, a cap glue 565, a cap 550, a diffuser 590, and an optical element 592. Although the term "adhesive" is used herein, any suitable material or fastener may be used to attach two components, such as an epoxy, solder, and so on.

The first and second light sources 505, 510 and the detector 545 may be positioned on the substrate 525 and attached to the substrate 525 using the adhesive 535. Additionally, the cap glue 565 may be used to attach the cap 550 to the substrate 525. The cap 550 may have an emitter window 526 and a detector window 528. The diffuser 590 may be positioned in the emitter window 526 and attached to the cap 550, such that light emitted by the light sources 505, 510 passes through the diffuser 590. The optical element 592 may be positioned in the detector window 528, and light returned from a target (not illustrated in FIG. 5) may pass through the optical element 592 to be received by the detector 545.

The substrate 525, cap 550, diffuser 590, and optical element 592 may, together, form a housing of the optical system 500. In alternative embodiments, the diffuser 590 and/or optical element 592 may be integrally formed with the cap 550.

In some embodiments, the diffuser 590 may be a cylindrical lens array. The cylindrical lens array may have multiple cylindrical lenses. The cylindrical lenses may diffuse light on a first axis and pass light on a second axis. The cylindrical lenses of the cylindrical lens array may face toward the first and second light sources 505, 510. The diffuser 590 will be described in further detail with reference to FIGS. 6A and 6B.

Figure 6A:
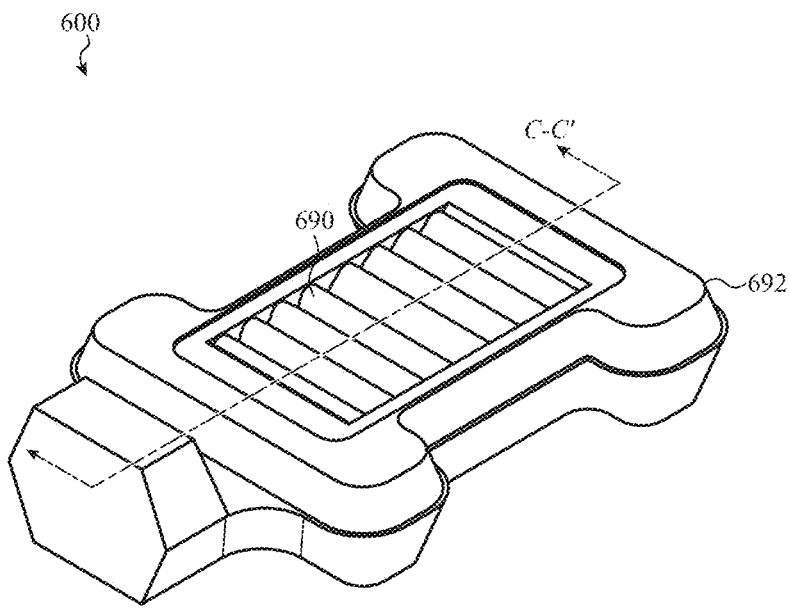
FIG. 6A shows an example of the diffuser shown in FIG. 5.

FIG. 6A shows an example of the diffuser shown in FIG. 5, and more particularly shows an example cylindrical lens array 600. In some embodiments, the cylindrical lens array 600 may include (e.g., be formed of) plastic, such as a plastic resin. The plastic may be temperature tolerant for manufacturing and assembly processes, and in some embodiments may withstand temperatures up to approximately 60 degrees Celsius without deforming. In some embodiments, the cylindrical lens array 600 may be formed of SABRIC® material RH1016, which may be sufficient to withstand rework of an optical system, or a device including same, while maintaining the structural integrity of the cylindrical lens array 600. The cylindrical lens array 600 may be flipped upside down and mounted within the emitter window described with reference to FIG. 5 (i.e., with the individual cylindrical lenses 690 oriented toward the light sources described with reference to FIG. 5. In some embodiments, the cylindrical lenses 690 may be bordered on one or more sides by a frame 692 that automatically centers the cylindrical lenses 690 within a housing, or emitter window, of an optical system.

Figure 6B:
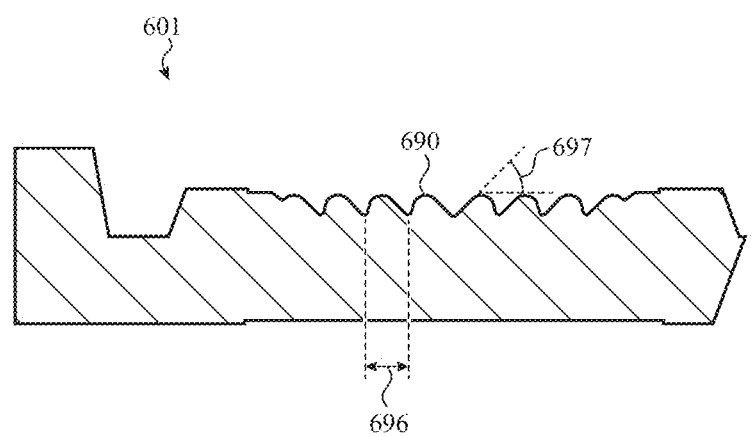
FIG. 6B illustrates a cross-section of the cylindrical lens array shown in FIG. 6A.

FIG. 6B illustrates a cross-section 601 of the cylindrical lens array 600 shown in FIG. 6 (taken from the viewpoint of view line C-C'). The cross-section 601 shows a series of cylindrical lenses 690 that are symmetrical about a center axis. The symmetry of the cylindrical lenses 690 diffuses light and allows an optical system to be tilted while maintaining consistently overlapped fields of illumination for a set of light sources that emits light into and through the cylindrical lenses 690. Although the cylindrical lenses 690 of the cylindrical lens array 600 are symmetrical about a center axis, with lenses on either side of the center axis leaning to the left or the right, in other embodiments, the cylindrical lenses 690 may not be symmetrical about a center axis. In some embodiments of the cylindrical lens array 600, different ones of the cylindrical lenses 690 may have different dimensions. For example, the curvature or rounding of different cylindrical lenses 690 may differ. In some embodiments, the pitch width 696 of different cylindrical lenses 690 may vary, or an angular orientation 697 of different cylindrical lenses 690 may vary.

As the curvature or rounding of a lens 690 is lessened, light passing through the cylindrical lens 690 may diffuse to a greater degree. Additionally, the angular orientation 697 of the lens may determine where light is primarily directed. Although eight cylindrical lenses 690 are depicted in FIGS. 6A and 6B, any number of lenses may be used to achieve a desired diffusion, or spread, of light received from multiple (i.e., two or more) light sources.

In some embodiments, parameters of the cylindrical lens array 600, such as the curvature or rounding of the cylindrical lenses 690, the pitch widths 696, the angular orientations 697, and the number of cylindrical lenses 690 may be selected to reduce crosstalk between a set of light sources and a detector (e.g., by diffusing light away from the detector).

Figure 7:
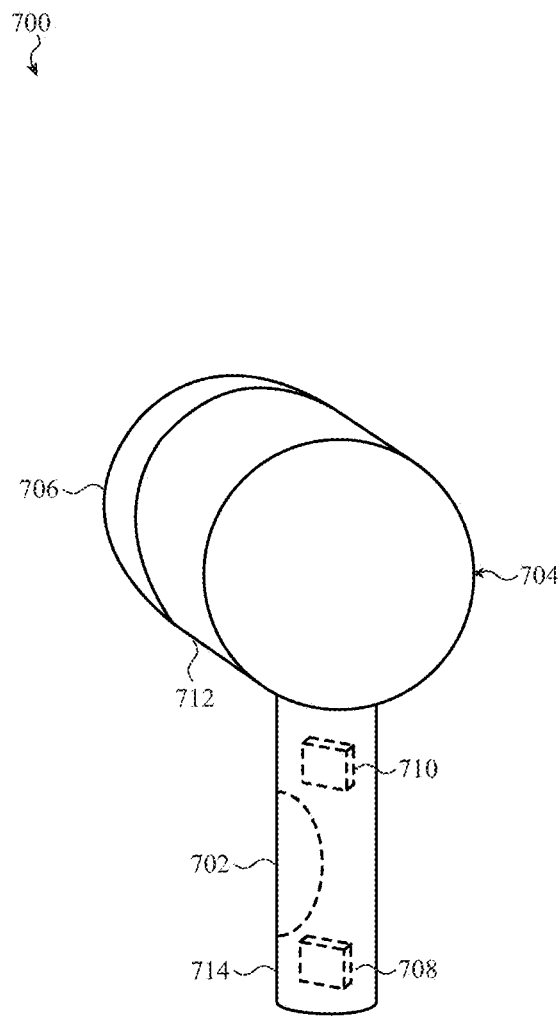
FIG. 7 shows an example of an earbud that includes an optical system.

The optical systems described herein may be incorporated into various types of electronic devices. By way of example, FIG. 7 shows an example of an earbud 700 (an electronic device) that includes an optical system 702. The earbud 700 may include a housing 704, which housing 704 may hold a speaker 706 that can be inserted into a user's ear, an optional microphone 708, and circuitry 710 (e.g., circuitry including a processor). The housing 704 may include a main body 712 and an optional stem 714 extending from the main body 712.

The circuitry 710 may be used to acquire audio from the microphone 708, transmit audio to the speaker 706, or communicate audio between the speaker 706, the microphone 708, and one or more remote devices The circuitry 710 may communicate with a remote device wirelessly (e.g., via a wireless communications interface, using a Wi-Fi, BLUETOOTH®, or cellular radio communications protocol, for example) or via one or more wires (e.g., via a wired communications interface, such as a Universal Serial Bus (USB) communications interface). In addition to communicating audio, the circuitry 710 may control aspects of the earbud 700 or other devices, transmit or receive instructions, and so on.

The optical system 702 may be used, for example, to determine a proximity of a user to the earbud 700 or speaker 706, or to receive input from a user as the user touches or makes a gesture on or near a portion of the housing 704 (e.g., the stem 714 or, alternatively, the main body 712). In some embodiments, the circuitry 710 may use the optical system 702 to distinguish types of matter that the earbud 700 may be proximate to (e.g., the circuitry 710 may determine a dual wavelength ratio using the optical system 702, as described elsewhere herein, and use the dual wavelength ratio to determine whether the earbud 700 is positioned in a user's ear or lying on a table). In some embodiments, the optical system 702 may be one of the optical systems described herein, or may incorporate aspects or principles of one or more of the optical systems described herein.

The circuitry 710 may include a processor and/or other components that are configured to determine or extract, at least partly in response to signals received directly or indirectly from one or more components of the optical system 702, information related to a proximity of a user, an input of a user, and so on. In some embodiments, the circuitry 710 may be configured to convey determined or extracted parameters or statuses, or raw sensor outputs, via a wired or wireless communications interface of the earbud 700, or via an audio or haptic interface of the earbud 700. The circuitry 710 may also or alternatively maintain or alter one or more settings, functions, or aspects of the earbud 700, including, in some cases, what is output via the speaker 706.

Figure 8:
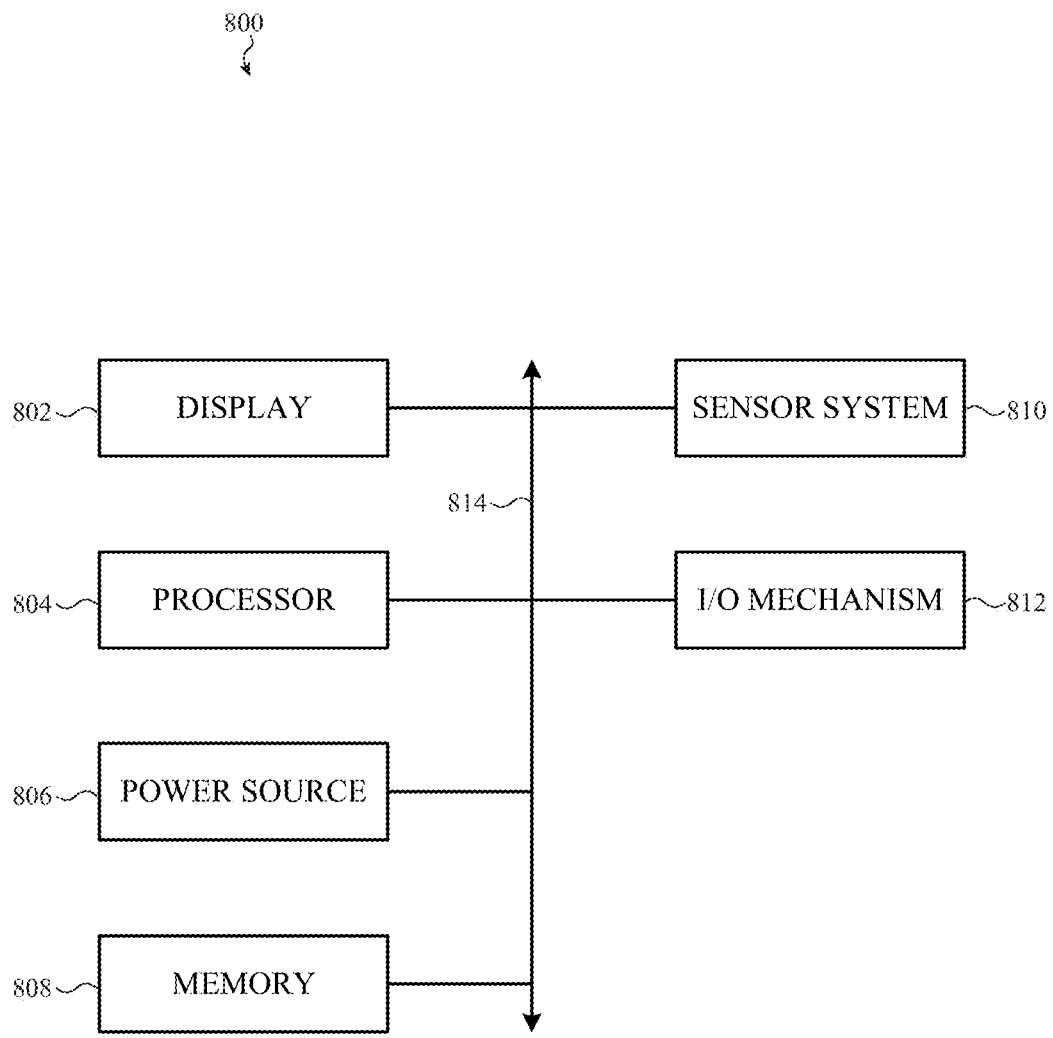
FIG. 8 shows an example electrical block diagram of an electronic device.

FIG. 8 shows an example electrical block diagram of an electronic device 800, which electronic device may in some cases incorporate aspects of the optical systems or electronic devices described with reference to FIGS. 3A-7. The electronic device 800 may include an optional display 802 (e.g., a light-emitting display), a processor 804, a power source 806, a memory 808 or storage device, a sensor system 810, or an input/output (I/O) mechanism 812 (e.g., an input/output device, input/output port, or haptic input/output interface). The processor 804 may control some or all of the operations of the electronic device 800. The processor 804 may communicate, either directly or indirectly, with some or all of the other components of the electronic device 800. For example, a system bus or other communication mechanism 814 can provide communication between the display 802, the processor 804, the power source 806, the memory 808, the sensor system 810, and the I/O mechanism 812.

The processor 804 may be implemented as any electronic device capable of processing, receiving, or transmitting data or instructions, whether such data or instructions is in the form of software or firmware or otherwise encoded. For example, the processor 804 may include a microprocessor, a central processing unit (CPU), an application-specific integrated circuit (ASIC), a digital signal processor (DSP), a controller, or a combination of such devices. As described herein, the term "processor" is meant to encompass a single processor or processing unit, multiple processors, multiple processing units, or other suitably configured computing element or elements. In some cases, the processor 804 may determine a dual wavelength ratio, a type of matter, or a proximity of the electronic device to a user or other object, as described with reference to FIGS. 3A-7.

The power source 806 may be implemented with any device capable of providing energy to the electronic device 800. For example, the power source 806 may include one or more batteries or rechargeable batteries. Additionally or alternatively, the power source 806 may include a power connector or power cord that connects the electronic device 800 to another power source, such as a wall outlet.

The memory 808 may store electronic data that can be used by the electronic device 800. For example, the memory 808 may store electrical data or content such as, for example, audio and video files, documents and applications, device settings and user preferences, timing signals, control signals, and data structures or databases. The memory 808 may include any type of memory. By way of example only, the memory 808 may include random access memory, read-only memory, Flash memory, removable memory, other types of storage elements, or combinations of such memory types.

The electronic device 800 may also include a sensor system 810 positioned almost anywhere on the electronic device 800. In some cases, the sensor system 810 may include first and second light sources and a detector, positioned and/or configured as described with reference to any of FIGS. 3A-7. The sensor system 810 may be configured to sense one or more types of parameters, such as but not limited to, vibration; light; touch; force; heat; movement; relative motion; biometric data (e.g., biological parameters) of a user; air quality; proximity; position; connectedness; matter type; and so on. By way of example, the sensor system 810 may include one or more of (or multiple of) a position sensor, a proximity sensor, a light or optical sensor (e.g., an electromagnetic radiation emitter and/or detector), an accelerometer, a pressure transducer, a gyroscope, a magnetometer, a health monitoring sensor, and an air quality sensor, and so on. Additionally, the sensor system 810 may utilize any suitable sensing technology, including, but not limited to, interferometric, magnetic, pressure, capacitive, ultrasonic, resistive, optical, acoustic, piezoelectric, or thermal technologies.

The I/O mechanism 812 may transmit or receive data from a user or another electronic device. The I/O mechanism 812 may include a touch sensing input surface, a crown, one or more buttons (e.g., a graphical user interface "home" button), one or more cameras (including an under-display camera), one or more microphones or speakers, one or more ports such as a microphone port, and/or a keyboard. Additionally or alternatively, the I/O mechanism 812 may transmit electronic signals via a communications interface, such as a wireless, wired, and/or optical communications interface. Examples of wireless and wired communications interfaces include, but are not limited to, cellular and Wi-Fi communications interfaces.

Figure 9:
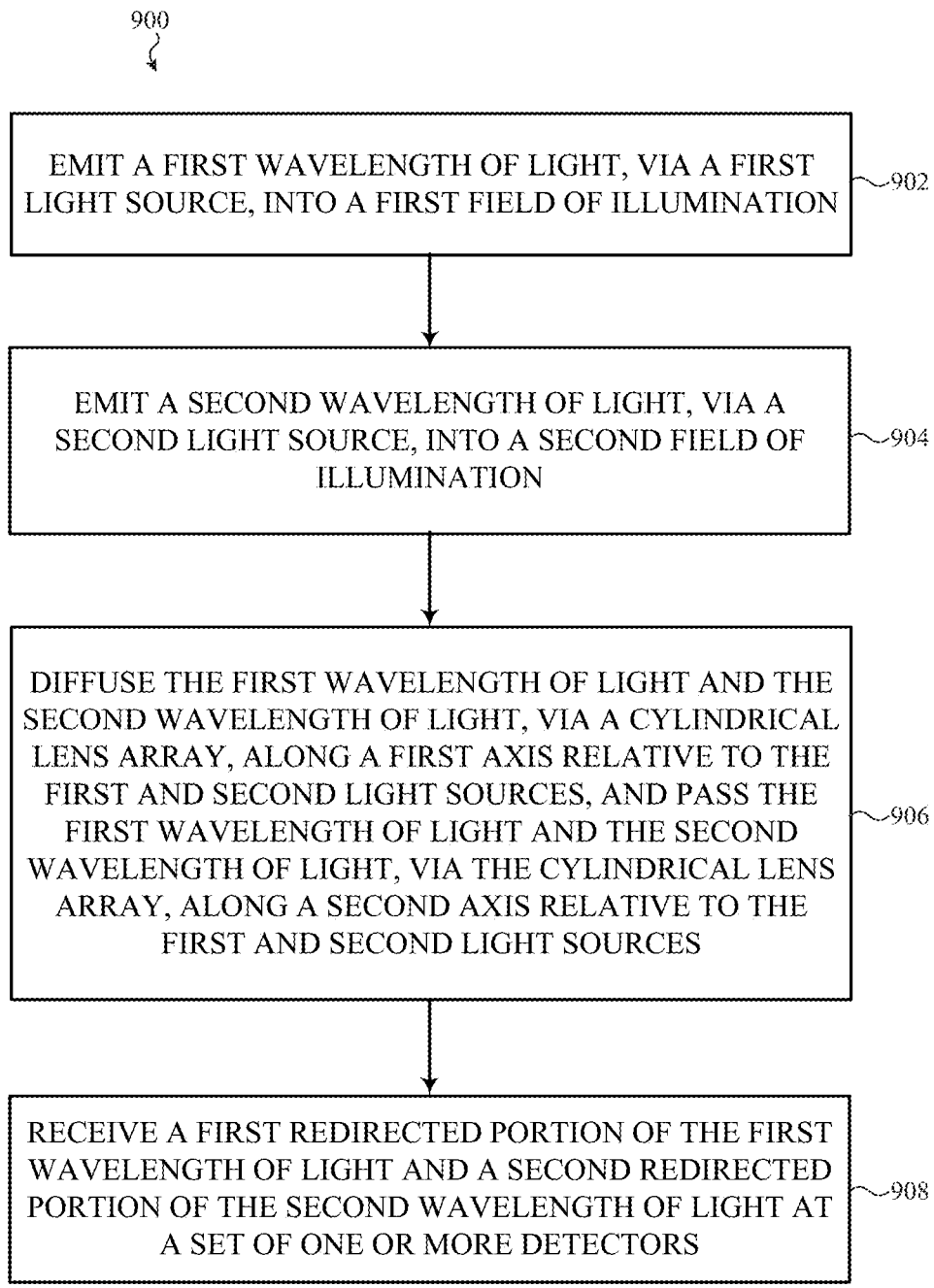
FIG. 9 shows an example method of optically sensing a target.

FIG. 9 shows an example method 900 of optically sensing a target. The method 900 may be performed by any of the electronic devices and/or optical systems described herein (e.g., by a processor controlling an optical system), or by other electronic devices and/or optical systems that embody the principles described herein.

At 902, the method 900 may include emitting a first wavelength of light, via a first light source, into a first field of illumination.

At 904, the method 900 may include emitting a second wavelength of light, via a second light source, into a second field of illumination.

At 906, the method 900 may include diffusing the first wavelength of light and the second wavelength of light, via a cylindrical lens array, along a first axis relative to the first and second light sources, and passing the first wavelength of light and the second wavelength of light, via the cylindrical lens array, along a second axis relative to the first and second light sources. The diffusing and passing may alter the first field of illumination and the second field of illumination and increase an overlap between the first field of illumination and the second field of illumination.

At 908, the method 900 may optionally include receiving a first redirected portion of the first wavelength of light and a second redirected portion of the second wavelength of light at a set of one or more detectors (e.g., photo-detector(s)). In some embodiments, the first and second wavelengths of light may be emitted at different times, and the first redirected portion of the first wavelength of light and the second redirected portion of the second wavelength of light may be received by a same detector of the set of one or more detectors (i.e., received by the same detector at different times).

In some embodiments, the method 900 may optionally include generating a first signal representing the first redirected portion of the first wavelength of light and a second signal representing the second redirected portion of the second wavelength of light. The first and second signals may be generated, in some embodiments, by a single detector, at different times. The first and second signals may alternatively be generated by different detectors at the same time (e.g., if the first and second light sources emit different wavelengths of light, different detectors may be filtered to receive the different wavelengths of light at the same time). The method 900 may further include calculating (e.g., using a processor) a tilt-independent dual wavelength ratio using the first and second signals. The tilt-independent dual wavelength ratio may be used to determine, for example, at least one of a proximity to the target (e.g., a proximity of an electronic device or optical system to the target) or a type of matter of the target.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

One aspect of the present technology may be the gathering and use of data available from various sources. The present disclosure contemplates that, in some instances, this gathered data may include personal information data that uniquely identifies or can be used to identify, locate, contact, or diagnose a specific person. Such personal information data can include skin type or user information related thereto, demographic data, location-based data, telephone numbers, email addresses, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to activate or deactivate various functions of the user's device, or gather demographic data or performance metrics for the user's device or the user. Further, other uses for personal information data that benefit the user are also contemplated by the present disclosure. For instance, demographic, health, or fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States (US), collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users may selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

What is claimed is:
1. An optical system, comprising:
  a housing defining a cylindrical lens array;
  a first light source located in the housing and positioned to emit a first wavelength of light into a first field of illumination impinging on the cylindrical lens array;

a second light source located in the housing and positioned to emit a second wavelength of light into a second field of illumination impinging on the cylindrical lens array, the cylindrical lens array configured to alter the first field of illumination and the second field of illumination so as to increase an overlap between the first field of illumination and the second field of illumination; and a detector located in the housing and positioned to receive a first redirected portion of the first wavelength of light and a second redirected portion of the second wavelength of light.

2. The optical system of claim 1, wherein the cylindrical lens array is configured to alter the first field of illumination and the second field of illumination by diffusing the first wavelength of light and the second wavelength of light along a first axis of the cylindrical lens array, and passing the first wavelength of light and the second wavelength of light without scattering along a second axis of the cylindrical lens array.

3. The optical system of claim 1, wherein the cylindrical lens array increases the overlap between the first field of illumination and the second field of illumination to at least 90% with respect to a target when the target is within a range of distances from the optical system.

4. The optical system of claim 3, wherein the range of distances is 1-4 millimeters from the cylindrical lens array.

5. The optical system of claim 1, further comprising:
a processor configured to,
receive, from the detector, a first signal representing the first redirected portion of the first wavelength of light and a second signal representing the second redirected portion of the second wavelength of light; and
use the first and second signals to calculate a tilt-independent dual wavelength ratio.

6. The optical system of claim 5, wherein the processor is configured to use the tilt-independent dual wavelength ratio to determine a type of matter of a target proximate to the optical system.

7. The optical system of claim 1, further comprising:
a processor configured to,
receive, from the detector, a first signal representing the first redirected portion of the first wavelength of light and a second signal representing the second redirected portion of the second wavelength of light; and
use the first and second signals to determine whether the optical system is proximate to a target.

8. The optical system of claim 1, wherein the first wavelength of light is in a range of 1000-1100 nanometers.

9. The optical system of claim 1, wherein the second wavelength of light is in a range of 1400-1500 nanometers.

10. The optical system of claim 1, wherein:
the housing includes,
a first housing component; and
a second housing component defining the cylindrical lens array and separate from the first housing component.

11. An optical system, comprising:
multiple light sources operable to emit multiple wavelengths of light;
a diffuser positioned to,
receive light from the multiple light sources;
diffuse light on a first axis; and
pass light on a second axis; and
a detector positioned to receive redirected portions of the emitted multiple wavelengths of light from a target;
wherein,
the diffuser directs the multiple wavelengths of light into respective fields of illumination having a defined overlap, the defined overlap independent of a tilt of the optical system with respect to the target when the target is within a range of distances from the optical system.

12. The optical system of claim 11, wherein:
the diffuser includes a cylindrical lens array; and
the respective fields of illumination have an overlap of at least 90% within the range of distances from the optical system.

13. The optical system of claim 11, wherein:
the diffuser includes a cylindrical lens array;
the cylindrical lens array includes multiple cylindrical lenses; and
a first cylindrical lens of the multiple cylindrical lenses has different dimensions than a second cylindrical lens of the multiple cylindrical lenses.

14. The optical system of claim 11, wherein:
the diffuser includes a cylindrical lens array; and
the cylindrical lens array comprises plastic.

15. The optical system of claim 11, wherein:
the diffuser includes a cylindrical lens array;
the cylindrical lens array comprises multiple cylindrical lenses; and
a first cylindrical lens of the multiple cylindrical lenses has a different angular orientation than a second cylindrical lens of the multiple cylindrical lenses.

16. A method of optically sensing a target, comprising:
emitting a first wavelength of light, via a first light source, into a first field of illumination;
emitting a second wavelength of light, via a second light source, into a second field of illumination;
diffusing the first wavelength of light and the second wavelength of light, via a cylindrical lens array, along a first axis relative to the first and second light sources; and
passing the first wavelength of light and the second wavelength of light, via the cylindrical lens array, along a second axis relative to the first and second light sources, the diffusing and passing altering the first field of illumination and the second field of illumination and increasing an overlap between the first field of illumination and the second field of illumination.

17. The method of claim 16, further comprising:
receiving a first redirected portion of the first wavelength of light and a second redirected portion of the second wavelength of light at a set of one or more detectors.

18. The method of claim 17, wherein:
the first wavelength of light and the second wavelength of light are emitted at different times; and
the first redirected portion of the first wavelength of light and the second redirected portion of the second wavelength of light are received by a same detector of the set of one or more detectors.

19. The method of claim 17, further comprising:
generating a first signal representing the first redirected portion of the first wavelength of light and a second signal representing the second redirected portion of the second wavelength of light; and
calculating a tilt-independent dual wavelength ratio using the first and second signals.

20. The method of claim 19, further comprising:
determining, using the tilt-independent dual wavelength ratio, at least one of a proximity to the target or a type of matter of the target.

* * * * *